United States Patent [19]

Kim et al.

[11] 4,181,794
[45] Jan. 1, 1980

[54] METHOD FOR MANUFACTURE OF OLEFIN POLYMER FIBRILS

[75] Inventors: Jin K. Kim; Clarence R. Murphy; Edward W. Smith, all of Houston, Tex.

[73] Assignee: Gulf Oil Corporation, Pittsburgh, Pa.

[21] Appl. No.: 937,353

[22] Filed: Aug. 28, 1978

[51] Int. Cl.² .............................................. C08F 6/06
[52] U.S. Cl. .......................... 528/496; 260/33.6 PQ; 260/33.8 UA; 264/9; 264/69
[58] Field of Search ....................... 528/496; 264/9, 69

[56] References Cited

U.S. PATENT DOCUMENTS

| 2,988,782 | 6/1961 | Parrish et al. | 260/30.6 R |
| 3,743,272 | 7/1973 | Nowotny et al. | 528/488 |
| 4,013,751 | 3/1977 | Davis et al. | 264/140 |

*Primary Examiner*—Stanford M. Levin
*Attorney, Agent, or Firm*—Richard L. Kelly

[57] ABSTRACT

A process for preparing olefin polymer fibrils is disclosed. A high molecular weight ethylene polymer is dissolved in methylene chloride in a first zone that is heated to develop a superatmospheric pressure. The polymer solution is fed to a second zone which is maintained at atmospheric pressure. The polymer solution is discharged into vigorously stirred isopropanol to form fibrils. Polymer solvent is distilled from the resulting slurry. The fibrils are refined in the isopropanol slurry. The polymer solvent and the isopropanol are recycled to the process.

11 Claims, 1 Drawing Figure

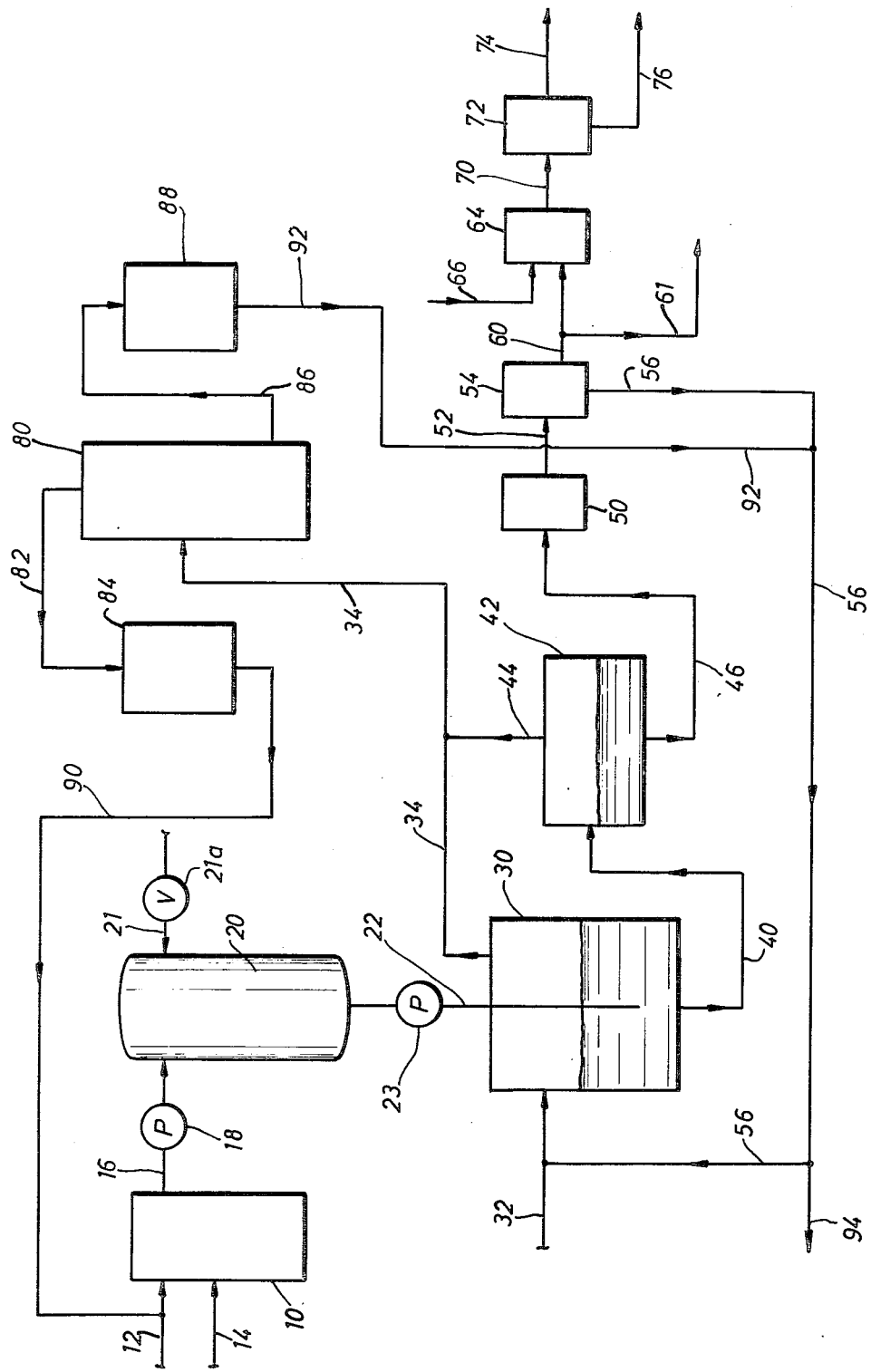

METHOD FOR MANUFACTURE OF OLEFIN POLYMER FIBRILS

BACKGROUND OF THE INVENTION

Olefin polymer fibrils constitute a recognized class of materials known and described in the art. See for example U.S. Pat. No. 2,988,782, U.S. Pat. No. 3,743,272, and U.S. Pat. No. 4,013,751. Such fibrils are prepared by precipitating an olefin polymer from an organic solvent solution thereof under conditions of high shear. The precipitation can be effected either by rapidly cooling the polymer solution from a high temperature to a lower temperature, or by adding a nonsolvent to the polymer solution.

Each of the processes reported in the literature for preparing olefin polymer fibrils suffers from one or more shortcomings. Certain of the processes produce fibrils having relatively poor physical properties. Other processes, while producing fibrils of adequate quality, suffer from high costs. Certain of the processes, which depend upon precipitating the olefin polymer by cooling the polymer solution thereof, are energy-intensive in requiring removal of very large quantities of heat. Other processes employing a precipitation technique based upon the addition of a nonsolvent to the polymer solution are capital intensive, in that numerous processing steps are required to separate the several liquids employed in the process.

For the above reasons, there is a need in the art for a low-cost, efficient process for the manufacture of olefin polymer fibrils of good quality.

SUMMARY OF THE INVENTION

The invention is directed to a low-cost, efficient process for producing high quality ethylene polymer fibrils. The process consists of heating a solution of an olefin polymer in a defined class of solvents in a first zone operated at superatmospheric pressure, and transferring hot polymer solution from the pressurized first zone through an elongated tubular transfer member to a second zone operated at substantially atmospheric pressure where the hot polymer solution is discharged into a stirred bath of a propanol to form fibrils therefrom. The polymer solvent is recovered by distillation and recycled to the process. The fibrils produced are refined in the propanol slurry in which they are prepared. The propanol then is recovered and recycled to the process.

BRIEF DESCRIPTION OF THE DRAWING

The single drawing is a schematic flow sheet showing the operation of the process.

DETAILED DESCRIPTION OF THE INVENTION

The olefin polymer employed in the invention will be a polymer of ethylene, propylene, or butene-1, including copolymers thereof; with the ethylene and propylene polymers being preferred. Fibrils having optimum physical properties are obtained when the olefin polymer has a weight average molecular weight of at least about 1 million and preferably at least about 1.5 million. Such polymers have an intrinsic viscosity of at least about 3.5, preferably at least 5.0, and more especially at least 10.0. A listing of suitable olefin polymers, including polymer mixtures containing olefin polymers, suitable for use in the invention is set forth in U.S. Pat. No. 4,013,751, which description is incorporated herein by reference.

The olefin polymer solvent employed in the invention will be any solvent which is characterized by four parameters. First, it will have the capacity of dissolving at least about 1.0 and preferably 2.0 or more weight % of the olefin polymer under the temperature and pressure conditions prevailing in the pressurized first zone of the process. Second, it will have a limited capacity of dissolving not more than about 0.2 weight % of the olefin polymer at ambient temperature when diluted with an equal volume of propanol. Third, it will have an atmospheric boiling point of less than about 65° C. Fourth, it will not form an azeotrope with n-propanol or isopropanol. Suitable examples of such solvents include chloroalkanes such as ethyl chloride, methylene chloride, chloroform, carbon tetrachloride, certain of the chlorofluoroalkanes, e.g., trichlorofluoro methane, and certain selected hydrocarbons such as cyclopentane.

In the first zone of the process, the olefin polymer and the olefin polymer solvent are introduced into a pressure resistant tank. The polymer and the solvent can be fed to the tank in separate streams, or as a previously formed solution, or as a slurry of polymer solids dispersed in the solvent. The polymer and solvent are introduced in a fixed ratio such that all of the polymer will dissolve at the temperature employed in the first zone. Typically, 2–12 and preferably 4–10 parts by weight of polymer are employed per 100 parts by weight of solvent. The temperature is maintained at about 150° C. or higher, preferably at 180° C. or higher. At such temperatures the solvent will dissolve a significant quantity of olefin polymer and, at the same time, the polymer solution will have a relatively low viscosity so that it can be readily processed. The temperature employed will generate a relatively high pressure of the order of at least about 25 and preferably at least about 40 atmospheres in the first zone. If desired, the pressure may be maintained at a fixed level by introducing an inert gas such as nitrogen as required.

The polymer solution formed in the first zone is transferred to a second zone by means of a suitable elongated tube-like transfer member having one or a plurality of restricted discharge orifices. Typically, the orifice(s) will have a diameter of the order of 1–10 mm. The orifice(s) are sized such that the polymer solution flows through the orifice(s) at a relatively high rate so as to subject the polymer solution to high shear. A valve or preferably a pump is included in the transfer line so that the polymer solution is transferred from the first zone to the second zone at a preselected steady rate.

The second zone of the process is a stirred vessel operated at substantially atmospheric pressure. The vessel is provided with an inlet through which a propanol, either n-propanol or isopropanol, is continuously fed to maintain a liquid level above the discharge orifice(s) of the tube-like transfer member which delivers the hot polymer solution to the vessel. As hot polymer solution is discharged into the propanol from the discharge orifice(s) of the transfer member, the polymer solution expands rapidly by reason of the pressure differential existing between the first zone and the second zone. The molten polymer undergoes significant shear by reason of this expansion. The shear thus imposed, both in passing through the discharge orifice and in expansion upon discharge therefrom, orients the solute polymer molecules in the polymer solution. The rapid cooling of the polymer solution, coupled with the diffusion of the propanol into the polymer solution, precipitates the polymer in the form of fibrils which have the orientation frozen therein.

The heat introduced into the second zone by the hot polymer solution increases its temperature to a level at which a substantial portion of the polymer solvent is vaporized. This vaporized polymer solvent is removed from the vessel for recovery as subsequently described. If desired, additional heat can be introduced into the second zone by conventional heat transfer means to vaporize additional quantities of the polymer solvent.

The propanol is stirred vigorously to disperse the precipitated polymer fibrils throughout the propanol to form an easily-handled slurry. The slurry is continuously withdrawn from the second zone and fed to a flash distillation apparatus to flash-distill the remaining polymer solvent from the propanol.

The slurry of the fibrils in the propanol, which now is substantially free of any polymer solvent, then is fed to a refining step. In the refining step, the slurry is passed through any suitable type of refiner to improve their physical properties. Preferably, this refining step is carried out in a disc refiner, or in a series of disc refiners aligned in series.

The slurry of refined fibrils in propanol next is separated from the propanol associated therewith. Preferably this operation is carried out in a centrifuge with the recovered phenol being recycled to the second zone of the process. The separated fibrils can be recovered at this stage of the process. Preferably, however, the fibrils are given an additional refining in an aqueous solution of polyvinyl alcohol (PVA) to improve their properties. After the fibrils have been refined in the presence of PVA, they are recovered for shipment or use.

The polymer solvent recovered from the second zone, which may have some propanol associated therewith, is fed to a distillation column. The polymer solvent, having a lower boiling point than the propanol and not forming an azeotrope therewith is recovered as an overhead fraction which can be recycled to the first zone of the process. Some small quantity of polymer solvent may build up in the propanol recovered from fibrils and recycled to the second zone of the process. To recover such polymer solvent for recycling to the first zone of the process, a slipstream of such propanol-polymer solvent can be fed to the distillation column.

The overall process as described has several advantages over the fibril-making processes reported in the art. Initially, it is noted that the temperature employed in the first zone of the process is relatively low. Second, the polymer solvent employed does not form an azeotrope with the propanol employed as the nonsolvent to precipitate the olefin polymer from the solution. Thus, the polymer solvent can be recovered by a simple low temperature distillation for recycling to the process. Consequently, the process has a relatively low energy requirement.

The propanol employed in the process serves a dual function in the process. For one, it is an efficient nonsolvent for precipitating the olefin polymer from the polymer solution in the second zone of the process. Second, the propanol, for reasons not fully understood, materially aids in the refining of the fibrils so that they develop excellent physical properties.

The apparatus illustrated in the drawing includes a polymer slurry tank 10 equipped with a suitable stirrer and heating means not shown. Line 12 is provided to feed polymer solvent to tank 10. Line 14 is provided to feed polymer solids to tank 10. Line 16, having a pump 18 therein, is provided to transfer polymer slurry from tank 10 to a pressure resistant tank 20.

Tank 20 is designed to operate safely at pressures of the order of 50 atmospheres or higher. A line 21 having a regulating valve 21a therein is provided to feed an inert gas to tank 20 intermittently as required to maintain a preselected pressure. An elongated tube-like member 22, having a pump 23 therein, is provided to transfer polymer solution from tank 20 to vessel 30. The discharge end of 22 is provided with suitable discharge orifices not shown.

Vessel 30 is provided with stirring and heating means not shown. Line 32 is provided to feed isopropanol to vessel 30. Line 34 is provided to remove distillate from vessel 30. Line 40 is provided to feed a slurry of fibrils and isopropanol to a flash distillation apparatus 42, which includes suitable heating means not shown. Line 44 is provided to remove overhead distillate from 42. Line 46 is provided to transfer the slurry of fibrils in isopropanol from 42 to fibril refining apparatus 50, which typically is a disc refiner.

Line 52 is provided to transfer the slurry of refined fibrils in isopropanol from the outlet side of refining apparatus 50 to separation apparatus 54, which typically is a centrifuge. Line 56 is provided to recycle isopropanol to line 32. Line 60 is provided to recover the fibrils from separating apparatus 54. Line 60 feeds directly to a second refining apparatus 64, which again typically is a disc refiner. Line 66 is provided to feed aqueous polyvinyl alcohol solution to refining apparatus 64. Line 61 is provided for optional direct recovery of fibrils from line 60.

Line 70 transfers refined slurry from 64 to separation apparatus 72, which again typically is a centrifuge. Line 74 is provided to recover fibrils from 72. Line 76 is provided to remove the aqueous polyvinyl alcohol solution from 72.

Line 34 is provided to feed distillate from vessel 30 and distillation apparatus 42 to approximately the midpoint of a distillation column 80. Line 82 feeds overhead from column 80 to an intermediate storage tank 84. Line 86 feeds a bottoms fraction from column 80 to a second intermediate storage tank 88. Line 90 feeds liquid from intermediate storage tank 84 to line 12. Line 92 feeds liquid from intermediate storage tank 88 to line 56. Line 94 is teed to line 56 to remove a slipstream therefrom.

In operation of the process, a finely-divided olefin polymer such as ethylene polymer having a weight average molecular weight of at least about one million is fed via line 14 to polymer slurry tank 10. A suitable solvent such as methylene chloride is fed via line 12 to polymer slurry tank 10. Typically, 6 parts of ethylene polymer are employed for each 100 parts of methylene chloride. The mixture is stirred well to suspend the fine polymer particles throughout the methylene chloride. Optionally, tank 10 may be heated to dissolve a substantial portion of the olefin polymer.

The methylene chloride slurry of the ethylene polymer is transferred to pressure tank 20 via line 16 by means of a suitable pump 18. Tank 20 is heated to a temperature of about 180° C. to develop a pressure of the order of 30 atmospheres. The olefin polymer dissolves in the methylene chloride under the prevailing temperature. An inert gas such as nitrogen from a high pressure source not shown may be fed to tank 20 as required via line 21 to maintain a preselected minimum operating pressure. The gas flow is controlled by regulating valve 21a.

The polymer solution from pressure tank 20 is fed to sealed vessel 30 via line 22. The rate of flow of polymer solution through line 22 and the pressure on the polymer solution at the discharge orifice(s) of line 22 are controlled by pump 23. Isopropanol is continuously introduced into vessel 30 via line 32 at a rate such that the liquid level in vessel 30 is continuously maintained above the discharge orifice of line 22. The isopropanol typically is introduced at a rate to deliver about 100 parts by weight of isopropanol to vessel 30 for each 3 parts by weight of polymer introduced via line 22. Vessel 30 is maintained under substantially atmospheric pressure. The temperature within vessel 30 is maintained between ambient temperature and the boiling point of methylene chloride. The required heat is provided principally by the hot polymer solution, but may be supplemented by auxiliary heating means not shown. As the hot polymer solution is discharged from the discharge orifice(s) of line 22, it expands rapidly by reason of the pressure differential existing between pressure tank 20 and vessel 30. The polymer undergoes significant shear by reason of the expansion of the polymer solution as it is discharged from line 22. The shear imposed on the polymer orients the polymer molecules. The rapid cooling of the polymer solution, coupled with the dilution of the polymer solution with isopropanol, precipitates the polymer to form fibrils which have orientation "frozen" therein. A substantial quantity of methylene chloride is vaporized at the prevailing temperature and removed via line 34. The isopropanol is stirred vigorously to disperse the fibrils and form a slurry.

A slurry of the fibrils in liquid isopropanol, which may contain some methylene chloride, is transferred via line 40 to flash distillation apparatus 42. The temperature within 42 is maintained sufficiently high so that substantially all of the methylene chloride carried into the apparatus is vaporized and removed via line 44.

A slurry of fibrils in isopropanol substantially free of methylene chloride is removed from distillation apparatus 42 via line 46. This slurry is fed to refining apparatus 50. The refined fibrils slurried in the isopropanol are removed from the discharge side of refining apparatus 50 via line 52. The slurry from line 52 is fed to separation apparatus 54. The isopropanol is discharged via line 56 and recycled to line 32. The recovered fibrils are recovered via line 60.

If desired, the fibrils from line 60 can be diverted via line 61 to a product recovery station. It is preferred practice, however, to treat the recovered fibrils with an aqueous solution of polyvinyl alcohol (PVA). The fibrils are fed via line 60, together with aqueous PVA solution (typically containing 6–10 weight % PVA) from line 66 to a second refining apparatus 64. The slurry of PVA-treated fibrils is transferred via line 70 to separating apparatus 72. The refined fibrils are recovered via line 74 with the spent PVA solution being removed via line 76.

The methylene chloride recovered from vessel 30 and flash distillation apparatus 42 is fed via line 34 to approximately the midpoint of distillation column 80. The lower boiling methylene chloride is recovered as an overhead fraction via line 82 and is transferred to intermediate storage vessel 84. The methylene chloride from intermediate storate tank 84 is recycled to the process via line 90 and line 12.

Any isopropanol carried into distillation column 80 is recovered as a bottoms fraction via line 86 and is transferred to intermediate storage tank 88. Isopropanol from intermediate storage tank 88 is fed via line 92 to line 56 which recycles isopropanol from separation apparatus 54 to line 32. As some small quantity of methylene chloride can be carried through the various processing steps to the separation apparatus 54, it is possible that over extended periods of operation there will be some undesired buildup of methylene chloride in the isopropanol recycled to vessel 30 via line 56. When this occurs, a slipstream can be removed from line 56 via line 94. This slipstream can be fed to distillation column 80 by lines not shown.

What is claimed:

1. A continuous method for the manufacture of olefin polymer fibrils which consists essentially of:
    a. Introducing an olefin polymer and a solvent therefor into a first zone,
    b. Heating said first zone to a temperature above the atmospheric boiling point of said solvent so as to maintain said olefin polymer in solution and to maintain said first zone under super-atmospheric pressure,
    c. Transferring polymer solution from said first zone to a second zone through an elongated tube-like transfer member,
    d. Feeding a propanol to said second zone to continuouslly maintain liquid propanol above the discharge orifice of the transfer member,
    e. Maintaining a temperature in said second zone such that:
        (i) the propanol is maintained in the liquid state, and
        (ii) the pressure is lower than the pressure in the first zone,
    f. Stirring the liquid propanol in said second zone,
    g. Precipitating olefin polymer in said second zone to form fibrils,
    h. Distilling at least a portion of the polymer solvent from said second zone,
    i. Removing a slurry of fibrils and propanol from said second zone,
    j. Flash distilling the bulk of any polymer solvent remaining in the slurry recovered in step (i),
    k. Passing the fibril-propanol slurry from step (j) through refining apparatus to refine the fibrils,
    l. Recovering refined fibrils and propanol from the slurry of step (k), and
    m. Recovering the polymer solvent and propanol and recycling same to steps (a) and (d) of the process; the solvent employed in step (a) being characterized in (1) having the capacity of dissolving at least about 1.0 weight % of the olefin polymer at the temperature employed in step (b), (2) having the capacity of dissolving not more than about 0.2 weight % of the olefin polymer at ambient temperature when diluted with an equal volume of propanol, (3) having an atmospheric boiling point of less than about 65° C. and (4) not forming an azeoptrope with the propanol employed in step (d).

2. The method of claim 1 in which the olefin polymer has a weight average molecular weight of at least about one million.

3. The method of claim 2 in which the olefin polymer is an ethylene polymer.

4. The method of claim 2 in which the olefin polymer is a a propylene polymer.

5. The method of claim 3 in which the propanol is isopropanol.

6. The method of claim 4 in which the propanol is isopropanol.

7. The method of claim 1, 3, 4, 5, or 6 in which the polymer solvent is selected from the group consisting of chloroalkanes, chlorofluoroalkanes, and cyclopentane.

8. The method of claim 5 in which the polymer solvent is methylene chloride.

9. The method of claim 1, 3, 4, 5, 6, or 8 in which the recovered refined fibrils from step (1) are treated with an aqueous solution of polyvinyl alcohol.

10. The method of claim 8 in which the materials in the first zone are heated to a temperature of at least about 150° C.

11. The method of claim 10 in which the recovered refined fibrils from step (1) are treated with an aqueous solution of polyvinyl alcohol.

* * * * *